US012807090B2

(12) United States Patent
Staser

(10) Patent No.: US 12,807,090 B2
(45) Date of Patent: Nov. 24, 2026

(54) VEHICLE EMERGENCY GLASS BREAKER SYSTEM

(71) Applicant: Inteva Products, LLC, Troy, MI (US)

(72) Inventor: Brian Staser, Oxford, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 0 days.

(21) Appl. No.: 19/308,586

(22) Filed: Aug. 25, 2025

(65) Prior Publication Data

US 2026/0061959 A1 Mar. 5, 2026

Related U.S. Application Data

(60) Provisional application No. 63/689,052, filed on Aug. 30, 2024.

(51) Int. Cl.
*B60R 21/0136* (2006.01)
*A62B 3/00* (2006.01)
*B60R 21/00* (2006.01)

(52) U.S. Cl.
CPC .......... *B60R 21/0136* (2013.01); *A62B 3/005* (2013.01); *B60R 2021/0016* (2013.01); *B60R 2021/0027* (2013.01)

(58) Field of Classification Search
CPC ........ B60R 21/0136; B60R 2021/0016; B60R 2021/0027; A62B 3/005
See application file for complete search history.

(56) References Cited

U.S. PATENT DOCUMENTS 3,160,338 A * 12/1964 Widman .................... B60J 9/02 225/93
3,741,583 A * 6/1973 Usui .......................... B60J 1/00 49/141
5,318,145 A * 6/1994 Vollmer .................. B60R 21/00 180/274
5,547,208 A * 8/1996 Chappell ................. E05B 81/82 180/281
5,657,543 A * 8/1997 Collins ..................... B25F 1/04 30/367
5,823,608 A * 10/1998 Tanaka ....................... B60J 9/00 49/141
6,053,271 A * 4/2000 Lee ....................... B60R 21/164 180/282

(Continued)

FOREIGN PATENT DOCUMENTS

CN 201544905 U * 8/2010
CN 206715064 U * 12/2017

(Continued)

*Primary Examiner* — Laura Freedman
(74) *Attorney, Agent, or Firm* — CANTOR COLBURN LLP

(57) ABSTRACT

A glass breaker system for shattering a window of a vehicle, including: a source of stored energy that is operably coupled to a glass punch which when released by a release device of the glass breaker system will cause the glass punch to move from an unactuated position to an actuated position, in the unactuated position a tip of the glass punch is not in contact with glass of the window and in the actuated position the tip of the glass punch will contact a portion of the glass of the window with a sufficient force in order to cause it to shatter.

20 Claims, 7 Drawing Sheets

(56) References Cited

U.S. PATENT DOCUMENTS

| | | | | |
|---|---|---|---|---|
| 6,079,071 | A * | 6/2000 | Sablan | B23D 51/03 30/155 |
| 6,418,628 | B1 * | 7/2002 | Steingass | B60R 22/32 30/367 |
| 6,551,159 | B1 * | 4/2003 | Spinelli | B63C 9/00 441/89 |
| 6,766,933 | B1 * | 7/2004 | Wang | A62B 3/005 173/202 |
| 6,816,064 | B1 * | 11/2004 | Ruiz | A62B 3/00 33/327 |
| 7,557,720 | B2 * | 7/2009 | Rubin | A62B 3/005 362/198 |
| 7,748,166 | B2 * | 7/2010 | Iacovoni | B60R 21/00 49/141 |
| 7,988,078 | B1 * | 8/2011 | Roy | A62B 3/005 241/99 |
| 8,419,062 | B2 * | 4/2013 | Landini | B60R 21/13 180/274 |
| 8,505,348 | B2 * | 8/2013 | Colasse | B25D 1/02 D8/347 |
| 8,727,060 | B1 * | 5/2014 | Erickson | B60R 21/00 30/367 |
| 8,740,030 | B2 * | 6/2014 | Purdy | A62B 3/005 225/103 |
| 8,869,927 | B2 * | 10/2014 | Oosterhuis | B60J 1/20 180/274 |
| 9,375,589 | B1 * | 6/2016 | Goodman | A62B 3/005 |
| 10,328,291 | B2 * | 6/2019 | Alexander | A62B 3/005 |
| 10,328,880 | B2 * | 6/2019 | Huang | A62B 3/005 |
| 10,376,719 | B1 * | 8/2019 | Xu | A62B 3/005 |
| 10,894,175 | B1 * | 1/2021 | Hirsius | A62B 3/005 |
| 11,225,214 | B2 * | 1/2022 | Hyde | B60Q 9/00 |
| 11,253,733 | B2 * | 2/2022 | Hirsius | A62B 3/005 |
| 11,351,404 | B2 * | 6/2022 | Hyde | B60R 21/00 |
| 11,780,302 | B2 * | 10/2023 | Weyrauch | B25D 1/00 296/97.9 |
| 11,998,775 | B2 * | 6/2024 | Salter | H04B 1/38 |
| 12,123,244 | B2 * | 10/2024 | Nowak | E05F 1/006 |
| 12,214,231 | B1 * | 2/2025 | Morgan | B60R 21/01 |
| 12,330,488 | B2 * | 6/2025 | Marega | B60J 9/02 |
| 12,479,387 | B1 * | 11/2025 | Ebrahimzadeh | B60R 21/02 |
| 2003/0089755 | A1 * | 5/2003 | Peers-Smith | A62B 3/005 225/103 |
| 2004/0050607 | A1 * | 3/2004 | Souther | A62B 3/005 180/271 |
| 2005/0082331 | A1 * | 4/2005 | Yang | A62B 3/005 225/2 |
| 2005/0210750 | A1 * | 9/2005 | MacDougall | E05C 3/16 49/141 |
| 2018/0250533 | A1 * | 9/2018 | Petersen | A44B 11/005 |
| 2018/0250534 | A1 * | 9/2018 | Riley | A44B 11/2561 |
| 2018/0361178 | A1 * | 12/2018 | Cheng | F41B 15/025 |
| 2021/0244974 | A1 * | 8/2021 | Uozumi | A62B 3/005 |
| 2022/0233892 | A1 * | 7/2022 | Yoshida | B60R 22/32 |
| 2025/0031578 | A1 * | 1/2025 | Renke | H10N 30/072 |
| 2025/0320765 | A1 * | 10/2025 | Buchner | B60R 25/01 |
| 2025/0333017 | A1 * | 10/2025 | Yang | B60R 21/0136 |

FOREIGN PATENT DOCUMENTS

| | | | | | |
|---|---|---|---|---|---|
| CN | 206950472 | U | * | 2/2018 | |
| CN | 210734078 | U | * | 6/2020 | |
| CN | 112937489 | A | * | 6/2021 | B60R 21/02 |
| CN | 114475508 | A | * | 5/2022 | B60R 21/02 |
| CN | 217886822 | U | * | 11/2022 | |
| CN | 220180738 | U | * | 12/2023 | |
| DE | 4016612 | A1 | * | 11/1991 | B60R 21/00 |
| DE | 4401396 | C2 | * | 2/1996 | B60R 21/00 |
| DE | 102012021864 | A1 | * | 5/2013 | B60J 1/00 |
| DE | 102018124454 | A1 | * | 4/2020 | B60R 21/00 |
| EP | 300944 | A1 | * | 1/1989 | |
| EP | 3653417 | A1 | * | 5/2020 | B60R 21/01 |
| GB | 2368366 | A | * | 5/2002 | A62B 3/005 |
| JP | H0516666 | A | * | 1/1993 | |
| JP | 10001005 | A | * | 1/1998 | |
| JP | 2947102 | B2 | * | 9/1999 | |
| JP | 2012245952 | A | * | 12/2012 | |
| KR | 950002192 | Y1 | * | 3/1995 | B60R 21/00 |
| KR | 19980038180 | U | * | 9/1998 | B60R 21/00 |
| KR | 19980039579 | U | * | 9/1998 | B60R 21/00 |
| KR | 0173396 | B1 | * | 2/1999 | B60R 21/00 |
| KR | 0173661 | B1 | * | 10/1999 | B60R 21/00 |
| KR | 200251171 | Y1 | * | 11/2001 | |
| KR | 100461252 | B1 | * | 12/2004 | B60J 1/08 |
| KR | 101359441 | B1 | * | 2/2014 | B60R 21/01 |
| KR | 101950716 | B1 | * | 2/2019 | A62B 3/005 |
| KR | 101966546 | B1 | * | 4/2019 | B60R 99/00 |
| WO | WO-2011122941 | A1 | * | 10/2011 | B60R 21/017 |

* cited by examiner

VEHICLE EMERGENCY GLASS BREAKER SYSTEM

CROSS REFERENCE TO RELATED APPLICATIONS

This application claims the benefit of U.S. Provisional Patent Application Ser. No. 63/689,052 filed on Aug. 30, 2024, the entire contents of which are incorporated herein by reference thereto.

BACKGROUND

Exemplary embodiments of the present disclosure pertain to the art of emergency glass breaker systems and in particular, an emergency glass breaker system for a vehicle.

There are times where it is desired to be able to exit a vehicle through the side door window opening, such as in a car accident where the door can no longer be opened due to damage or blockage.

Thus it is desirable to provide an apparatus or system for breaking glass in a vehicle during certain situations.

BRIEF DESCRIPTION

Disclosed is a glass breaker system for shattering a window of a vehicle, including: a source of stored energy that is operably coupled to a glass punch, the source of stored energy when released by a release device of the glass breaker system will cause the glass punch to move from an unactuated position to an actuated position, in the unactuated position a tip of the glass punch is not in contact with glass of the window and in the actuated position the tip of the glass punch will contact a portion of the glass of the window with a sufficient force in order to cause it to shatter.

In addition to one or more of the features described above, or as an alternative to any of the foregoing embodiments, the source of stored energy is a spring.

In addition to one or more of the features described above, or as an alternative to any of the foregoing embodiments, the glass breaker system is manually operated by a manual release lever or switch.

In addition to one or more of the features described above, or as an alternative to any of the foregoing embodiments, the glass punch is pivotally mounted to a housing or bracket.

In addition to one or more of the features described above, or as an alternative to any of the foregoing embodiments, the tip is a metal tip formed from tungsten carbide or steel.

In addition to one or more of the features described above, or as an alternative to any of the foregoing embodiments, the source of stored energy is a spring and the glass breaker system is manually operated by a manual release lever or switch.

In addition to one or more of the features described above, or as an alternative to any of the foregoing embodiments, the source of stored energy is a spring and the glass punch is pivotally mounted to a housing or bracket and the glass breaker system further comprises a blocking member that prevents the glass punch from rotating from the unactuated position to the actuated position and the blocking member is operably coupled to a manual release lever or switch.

In addition to one or more of the features described above, or as an alternative to any of the foregoing embodiments, the source of stored energy is automatically released when a preprogramed sensor or sensor determines that the source of stored energy should be released.

Also disclosed is a vehicle door, including: a window; a glass breaker system for shattering the window, the glass breaker system including: a source of stored energy that is operably coupled to a glass punch, the source of stored energy when released by a release device of the glass breaker system will cause the glass punch to move from an unactuated position to an actuated position, in the unactuated position a tip of the glass punch is not in contact with glass of the window and in the actuated position the tip of the glass punch will contact a portion of the glass of the window with a sufficient force in order to cause it to shatter.

In addition to one or more of the features described above, or as an alternative to any of the foregoing embodiments, the source of stored energy is a spring.

In addition to one or more of the features described above, or as an alternative to any of the foregoing embodiments, the glass breaker system is manually operated by a manual release lever or switch.

In addition to one or more of the features described above, or as an alternative to any of the foregoing embodiments, the glass punch is pivotally mounted to a housing or bracket.

In addition to one or more of the features described above, or as an alternative to any of the foregoing embodiments, the tip is a metal tip formed from tungsten carbide or steel.

In addition to one or more of the features described above, or as an alternative to any of the foregoing embodiments, the source of stored energy is a spring and the glass breaker system is manually operated by a manual release lever or switch.

In addition to one or more of the features described above, or as an alternative to any of the foregoing embodiments, the source of stored energy is a spring and the glass punch is pivotally mounted to a housing or bracket and the glass breaker system further comprises a blocking member that prevents the glass punch from rotating from the unactuated position to the actuated position and the blocking member is operably coupled to a manual release lever or switch.

In addition to one or more of the features described above, or as an alternative to any of the foregoing embodiments, the source of stored energy is automatically released when a preprogramed sensor or sensor determines that the source of stored energy should be released.

Also disclosed is a method for shattering a window of a vehicle, including: releasing a source of stored energy of a glass breaker system, the source of stored energy is operably coupled to a glass punch, the source of stored energy when released by a release device of the glass breaker system will cause the glass punch to move from an unactuated position to an actuated position, in the unactuated position a tip of the glass punch is not in contact with glass of the window and in the actuated position the tip of the glass punch will contact a portion of the glass of the window with a sufficient force in order to cause it to shatter.

In addition to one or more of the features described above, or as an alternative to any of the foregoing embodiments, the source of stored energy is a spring.

In addition to one or more of the features described above, or as an alternative to any of the foregoing embodiments, the glass breaker system is manually operated by a manual release lever or switch.

In addition to one or more of the features described above, or as an alternative to any of the foregoing embodiments, the source of stored energy is automatically released when a preprogramed sensor or sensor determines that the source of stored energy should be released.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
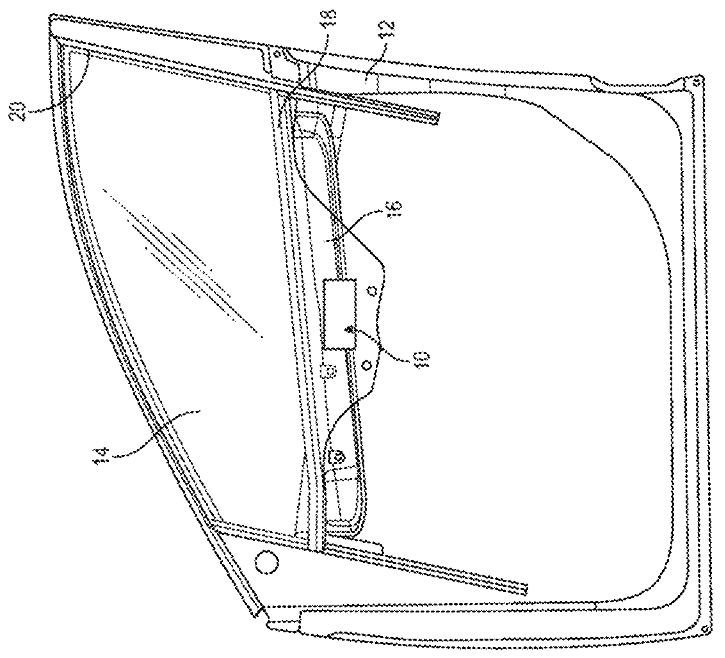
FIG. 1 is illustrates where an emergency glass breaker system may be located in a vehicle in accordance with the present disclosure.

FIG. 1 is illustrates one non-limiting location where an emergency glass breaker system 10 may be located in a vehicle in accordance with the present disclosure. In FIG. 1 a portion of a vehicle door 12 is illustrated. The vehicle door 12 includes a window 14 formed from tempered glass. A portion 16 of the window 14 is always below a sill 18 of an opening 20 of the vehicle door 12 regardless of the position of the window 14 in the opening 20 (e.g., open, closed or partially open or closed).

Figure 2:
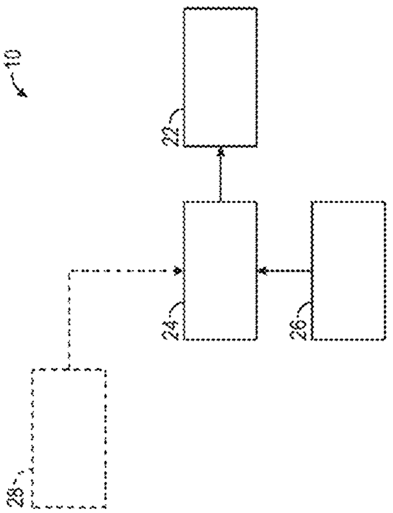
FIG. 2 is a schematic illustration of an emergency glass breaker system in accordance with the present disclosure.

Referring now to FIGS. 1 and 2, the glass breaker system 10 is a device with sufficient stored energy to break the glass of the window with a glass punch 22 which may include a metal tip (blunt or pointed) that is formed from a metal sufficiently hard enough to break the tempered glass of the window. It is understood, that other configurations of the tip are contemplated. One non-limiting example of such a material or metal is tungsten carbide or steel. It is understood that other materials are contemplated. The glass breaker system 10 includes a source 24 of stored energy that is operably coupled to the glass punch 22 which when released by a release device 26 will cause the glass punch 22 to move from an unactuated position to an actuated position. In the unactuated position the tip of the glass punch 22 is not in contact with the tempered glass of the window 14 and in the actuated position the tip of the glass punch 22 will contact a portion of the tempered glass of the window 14 with a sufficient force in order to cause it to shatter.

The release device 26 can be one of several types for example, a manual release type or an automatic type. In the manual release type, a manual release lever or switch could be located conveniently on the door trim. Upon actuation of the manual release lever or switch the source of stored energy 24 (e.g., compressed spring, compressed air, motor, actuator, solenoid or other energy storage device) is released and the glass punch 22 is moved from the unactuated position to the actuated position).

In the automatic type the source 24 of stored energy (e.g., compressed spring, compressed air, motor, actuator, solenoid or other energy storage device) moves the glass punch 22 from and unactuated position to an actuated position when preprogrammed sensor(s) or sensor(s) 28 (illustrated in dashed lines) determine that breaking the glass would or could be advisable. For example, when the preprogramed sensors or sensors determine that a collision has occurred and the door may be inoperable or the vehicle is submerged in water and breaking of the window will be more beneficial than harmful to the occupants. In one non-limiting embodiment, the preprogramed sensor(s) or sensor(s) 28 are operably coupled to a microcontroller or controller for controlling the source 24 of stored energy. Note in at least one embodiment the sensor(s) 28 may not be necessary and are not used.

In yet another alternative, the glass breaker system 10 may use both preprogrammed sensor(s) or sensor(s) 28 and the release device 26 wherein the release device 26 will not release the source 24 of stored energy (e.g., actuation of the release device 26) unless the preprogrammed sensor(s) or sensors (28) determine that actuation of the glass breaker system 10 is desired and then actuation of the release device 26 will release the source 24 of stored energy when actuated.

In one embodiment, the system is intended for use with tempered glass as laminated glass may not shatter appropriately with this type of energy release.

Figure 3:
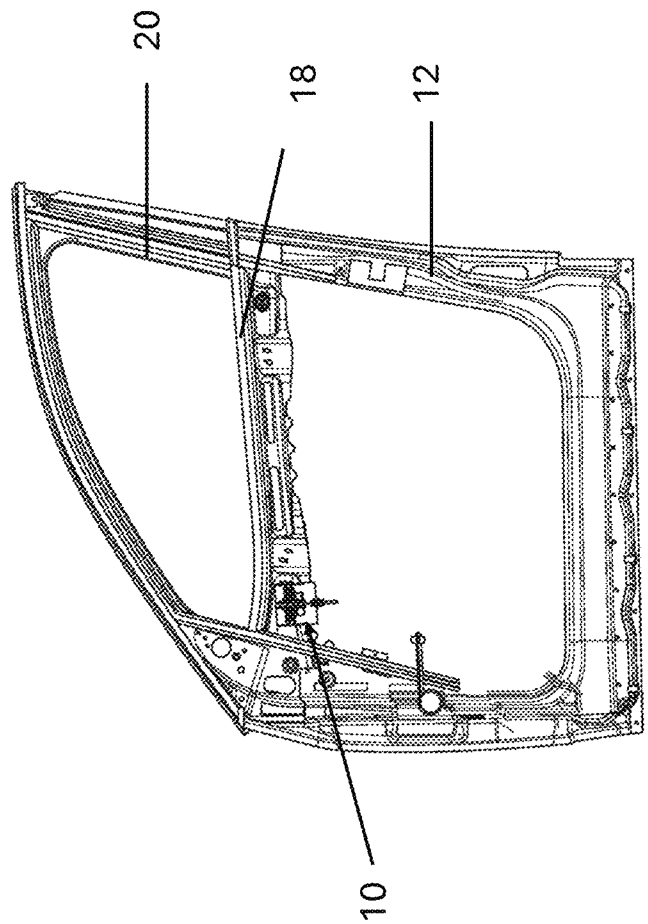
FIG. 3 is illustrates a portion of a vehicle door without a window and a possible location of an emergency glass breaker system in accordance with the present disclosure.
Figure 4:
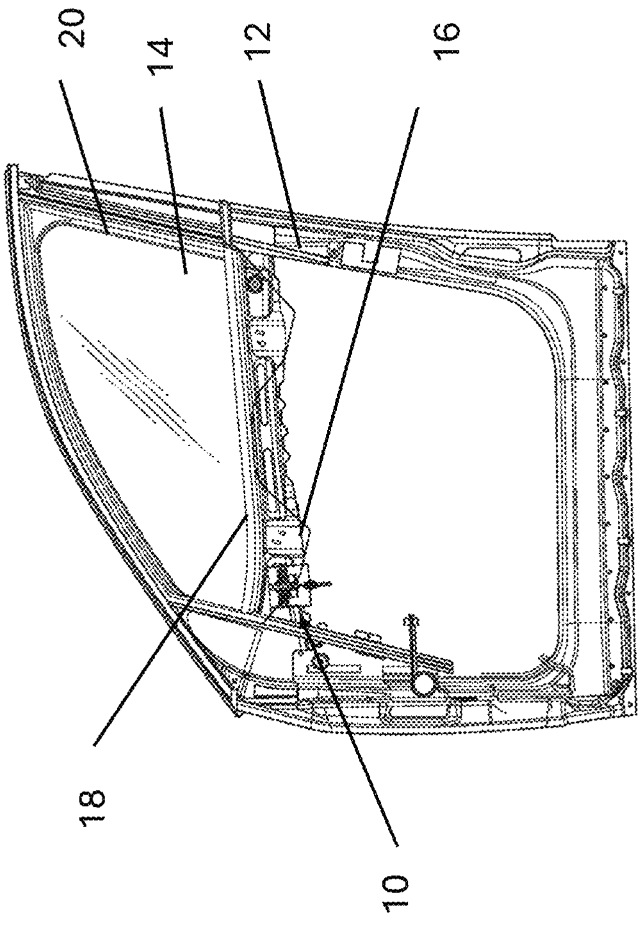
FIG. 4 is illustrates a portion of a vehicle door with a window and a possible location of an emergency glass breaker system in accordance with the present disclosure.
Figure 5:
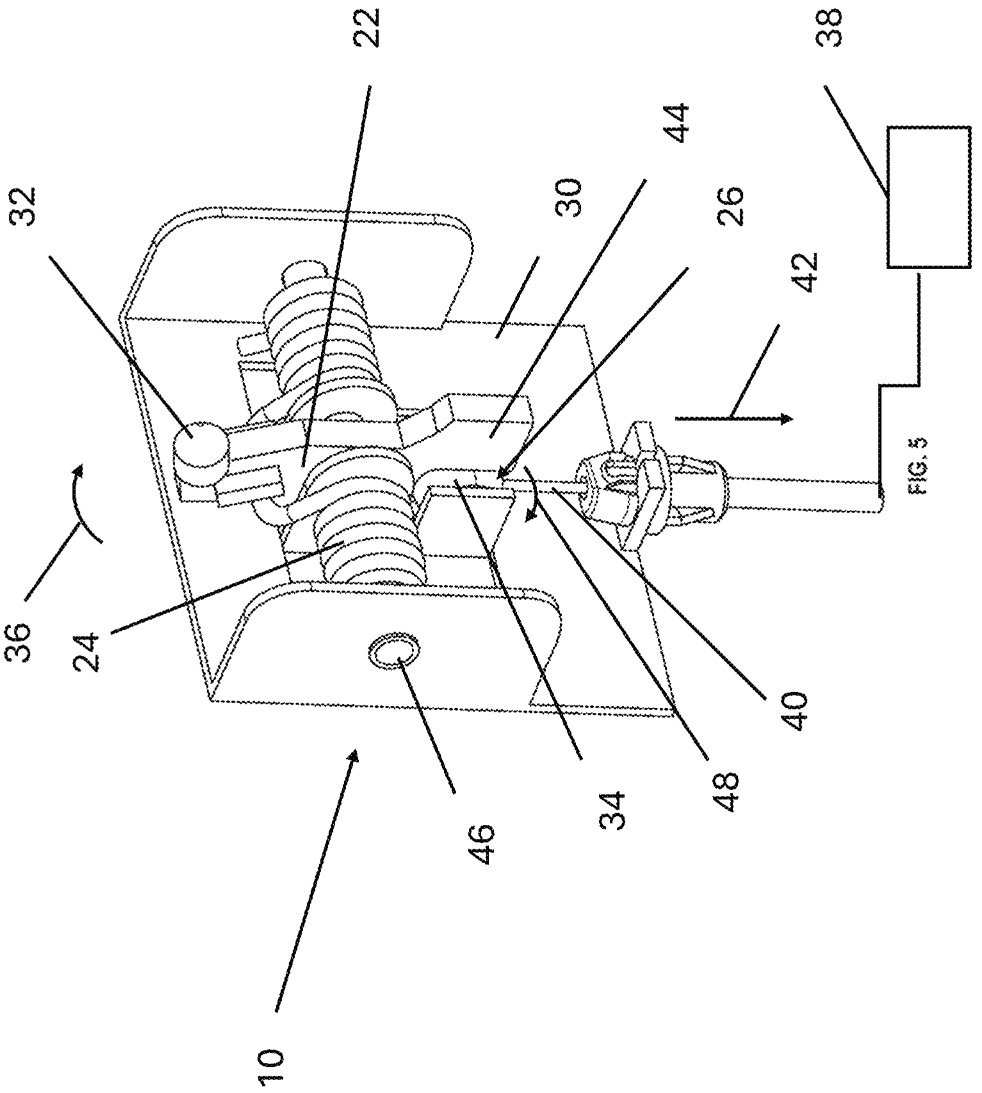
FIG. 5 is a perspective view of an emergency glass breaker system in accordance with the present disclosure.
Figure 6:
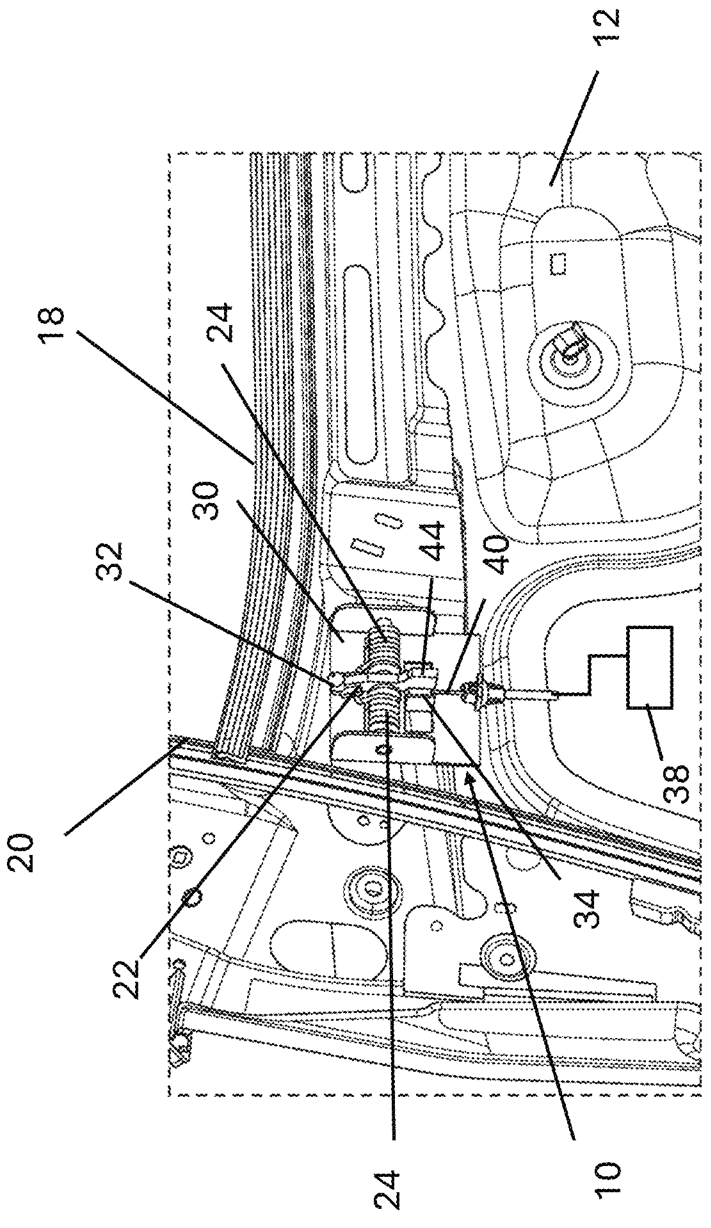
FIG. 6 is a perspective view a portion of a vehicle door with an emergency glass breaker system in accordance with the present disclosure.
Figure 7:
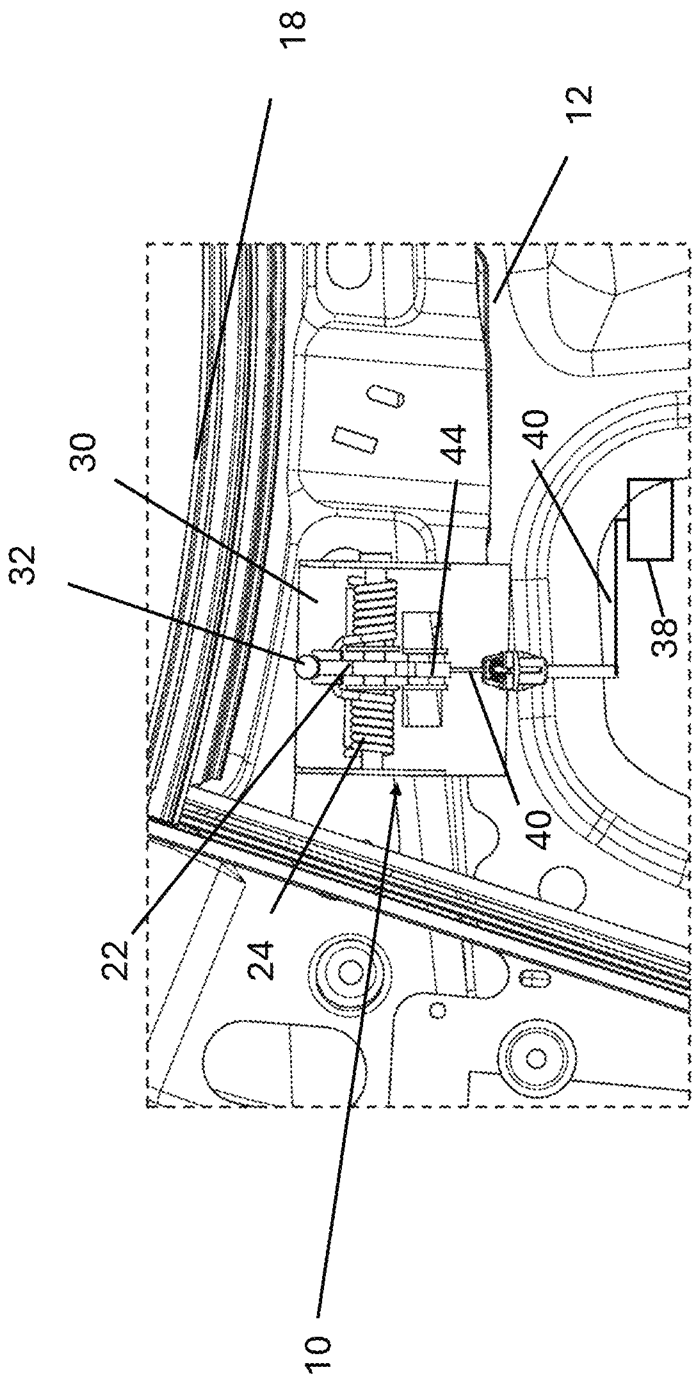
FIG. 7 is a view a portion of a vehicle door with an emergency glass breaker system in accordance with the present disclosure.

Referring now to FIG. 3 a portion of a vehicle door 12 without a window 14 and a possible location of an emergency glass breaker system 10 in accordance with one non-limiting embodiment of the present disclosure is illustrated. FIG. 4 illustrates a portion of a vehicle door 12 with a window 14 and a possible location of an emergency glass breaker system 10 in accordance with one non-limiting embodiment of the present disclosure. FIG. 5 is a perspective view of an emergency glass breaker system 10 in accordance with one non-limiting embodiment of the present disclosure. FIG. 6 is a perspective view a portion of the vehicle door 12 with an emergency glass breaker system 10 in accordance with one non-limiting embodiment of the present disclosure and FIG. 7 is another view a portion of the vehicle door 12 with an emergency glass breaker system 10 in accordance with one non-limiting embodiment of the present disclosure. As illustrated in at least FIGS. 1 and 3-4, the emergency glass breaker system 10 is secured to a vehicle door 12.

Referring now to at least FIGS. 5-7, an emergency glass breaker system 10 in accordance with one non-limiting embodiment of the present disclosure is illustrated. Here the emergency glass breaker system 10 is a manual system, where no sensor(s) 28 mentioned above are used or required. Here the glass punch 22 is pivotally mounted to a housing or bracket 30 for movement between an unactuated position wherein a metal tip 32 (blunt or pointed) does not make contact with the portion 16 of the window 18 and an actuated position where the metal tip 32 makes contact with the portion 16 of the window 18 and shatters the window 18. As previously mentioned, the metal tip 32 is formed from a metal sufficiently hard enough to break the tempered glass of the window 14 and the force applied to the glass punch 22 by the source 24 of stored energy is sufficient to shatter the glass of the window 14. It is understood, that other configurations of the tip 32 are contemplated. One non-limiting example of such a material or metal is tungsten carbide or steel. It is understood that other materials are contemplated.

As illustrated in at least FIGS. 5-7, the source 24 of stored energy is a spring 24. As mentioned, above, the spring or source of stored energy 24 is operably coupled to the glass punch 22 in order to provide a sufficient amount of force to shatter the glass of the window 14 when the glass punch 22 is moved into the actuated position. In FIGS. 5-7, the glass punch 22 is in the unactuated position and the spring 24 is compressed. In this position, the release device 26, which includes a blocking member 34 prevents the glass punch from rotating from the unactuated position, illustrated in FIGS. 5-7, in the direction of arrow 36 to the actuated position. Once the blocking member 34 is moved from the blocking position illustrated in at least FIGS. 5-7, to a position where the blocking member 34 is no longer contacting the glass punch 22, the compressed spring 24 will cause the metal tip 32 of the glass punch 22 to move generally in the direction of arrow 36 from the unactuated position to the actuated position. As mentioned above, when the glass punch 22 is in the unactuated position the metal tip 32 of the glass punch 22 is not in contact with the tempered glass of the window 14 and in the actuated position the metal tip 32 of the glass punch 22 will contact a portion 16 of the tempered glass of the window 14 with a sufficient force (applied by the source 24 of stored energy) in order to cause it to shatter.

The blocking member 34 is operably coupled to a manual release lever or switch 38 (illustrated schematically) that may be located conveniently on a trim of the vehicle door 12 for access by a passenger of the vehicle. The manual release lever or switch 38 is operably coupled to the blocking member 34 via a cable or rod 40. Upon actuation of the manual release lever or switch 38, the blocking member 34 is moved in the direction of arrow 42 until the blocking member 34 is no longer blocking a portion 44 of the glass punch 22 and the source of stored energy or spring 24 is released and the metal tip 32 of the glass punch 22 moves in the direction of arrow 36. In the non-limiting embodiment illustrated in at least FIGS. 5-7, the glass punch pivots or rotates about an axis 46 where the metal tip 32 moves in the general direction of arrow 36 and the portion 44 of the glass punch 22 moves generally in the direction of arrow 48 when the source of stored energy or spring 24 is released and the glass punch 22 is moved from the unactuated position to the actuated position.

In the automatic type of emergency glass breaker system 10 in accordance with another embodiment of the present disclosure, the source 24 of stored energy (e.g., compressed spring, compressed air, motor, actuator, solenoid or other energy storage device) automatically moves the glass punch 22 from the unactuated position to an actuated position when preprogrammed sensor(s) or sensor(s) 28 (illustrated in dashed lines in FIG. 2) determine that breaking the glass would or could be advisable. For example, when the preprogramed sensor(s) or sensor(s) 28 determine that a collision has occurred and the door 12 may be inoperable or the vehicle is submerged in water and breaking of the window 14 will be more beneficial than harmful to the occupants. The source of stored energy or spring 24 is automatically released and the glass punch 22 is moved from the unactuated position to the actuated position. For example, the blocking member 34 can be automatically moved from its blocking position by an actuator instead of the manual release lever or switch 38 and the source of stored energy or spring 24 is automatically released and the glass punch 22 is moved from the unactuated position to the actuated position.

In yet another non-limiting embodiment, a hybrid system is provided wherein a manual emergency glass breaker system 10 is provided (such as in FIGS. 5-7) however the manual release lever or switch 38 is not operable unless the preprogramed sensor(s) or sensor(s) 28 determine that a collision has occurred and the door 12 may be inoperable or the vehicle is submerged in water and breaking of the window 14 will be more beneficial than harmful to the occupants. Then the manual release lever or switch 38 must be operated (as mentioned above) to move the glass punch 22 from the unactuated position to an actuated position.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A glass breaker system for shattering a window of a vehicle, comprising:

a source of stored energy that is operably coupled to a glass punch, the source of stored energy when released by a release device of the glass breaker system will cause the glass punch to move from an unactuated position to an actuated position, in the unactuated position a tip of the glass punch is not in contact with glass of the window and in the actuated position the tip of the glass punch will contact a portion of the glass of the window with a sufficient force in order to cause it to shatter;

further comprising a blocking member that contacts a portion of the glass punch when the glass punch is in the unactuated position, preventing movement of the glass punch to the actuated position;

wherein the blocking member is moved along a linear path away from a pivot axis of the glass punch to allow the glass punch to move from the unactuated position to the actuated position.

2. The glass breaker system as in claim 1, wherein the source of stored energy is a spring.

3. The glass breaker system as in claim 1, wherein the glass breaker system is manually operated by a manual release lever or switch.

4. The glass breaker system as in claim 1, wherein the glass punch is pivotally mounted to a housing or bracket.

5. The glass breaker system as in claim 1, wherein the tip is a metal tip formed from tungsten carbide or steel.

6. The glass breaker system as in claim 1, wherein the source of stored energy is a spring and the glass breaker system is manually operated by a manual release lever or switch.

7. The glass breaker system as in claim 1, wherein the source of stored energy is a spring and the glass punch is pivotally mounted to a housing or bracket and the blocking member is operably coupled to a manual release lever or switch.

8. The glass breaker system as in claim 1, wherein the source of stored energy is automatically released when a preprogramed sensor or sensor determines that the source of stored energy should be released.

9. A vehicle door, comprising:

a window;

a glass breaker system for shattering the window, the glass breaker system comprising: a source of stored energy that is operably coupled to a glass punch, the source of stored energy when released by a release device of the glass breaker system will cause the glass punch to move from an unactuated position to an actuated position, in the unactuated position a tip of the glass punch is not in contact with glass of the window and in the actuated position the tip of the glass punch will contact a portion of the glass of the window with a sufficient force in order to cause it to shatter;

further comprising a blocking member that contacts a portion of the glass punch when the glass punch is in the unactuated position, preventing movement of the glass punch to the actuated position;

wherein the blocking member is moved along a linear path away from a pivot axis of the glass punch to allow the glass punch to move from the unactuated position to the actuated position.

10. The vehicle door as in claim 9, wherein the source of stored energy is a spring.

11. The vehicle door as in claim 9, wherein the glass breaker system is manually operated by a manual release lever or switch.

12. The vehicle door as in claim 9, wherein the glass punch is pivotally mounted to a housing or bracket.

13. The vehicle door as in claim 9, wherein the tip is a metal tip formed from tungsten carbide or steel.

14. The vehicle door as in claim 9, wherein the source of stored energy is a spring and the glass breaker system is manually operated by a manual release lever or switch.

15. The vehicle door as in claim 9, wherein the source of stored energy is a spring and the glass punch is pivotally mounted to a housing or bracket and the blocking member is operably coupled to a manual release lever or switch.

16. The vehicle door as in claim 9, wherein the source of stored energy is automatically released when a preprogramed sensor or sensor determines that the source of stored energy should be released.

17. A method for shattering a window of a vehicle, comprising:

releasing a source of stored energy of a glass breaker system, the source of stored energy is operably coupled to a glass punch, the source of stored energy when released by a release device of the glass breaker system will cause the glass punch to move from an unactuated position to an actuated position, in the unactuated position a tip of the glass punch is not in contact with glass of the window and in the actuated position the tip of the glass punch will contact a portion of the glass of the window with a sufficient force in order to cause it to shatter;

further comprising a blocking member that contacts a portion of the glass punch when the glass punch is in the unactuated position, preventing movement of the glass punch to the actuated position;

wherein the blocking member is moved along a linear path away from a pivot axis of the glass punch to allow the glass punch to move from the unactuated position to the actuated position.

18. The method as in claim 17, wherein the source of stored energy is a spring.

19. The method as in claim 17, wherein the glass breaker system is manually operated by a manual release lever or switch.

20. The method as in claim 17, wherein the source of stored energy is automatically released when a preprogramed sensor or sensor determines that the source of stored energy should be released.

* * * * *